Jan. 7, 1969 R. W. DYMOND 3,420,580
SKID CONTROL DEVICE
Filed May 11, 1967
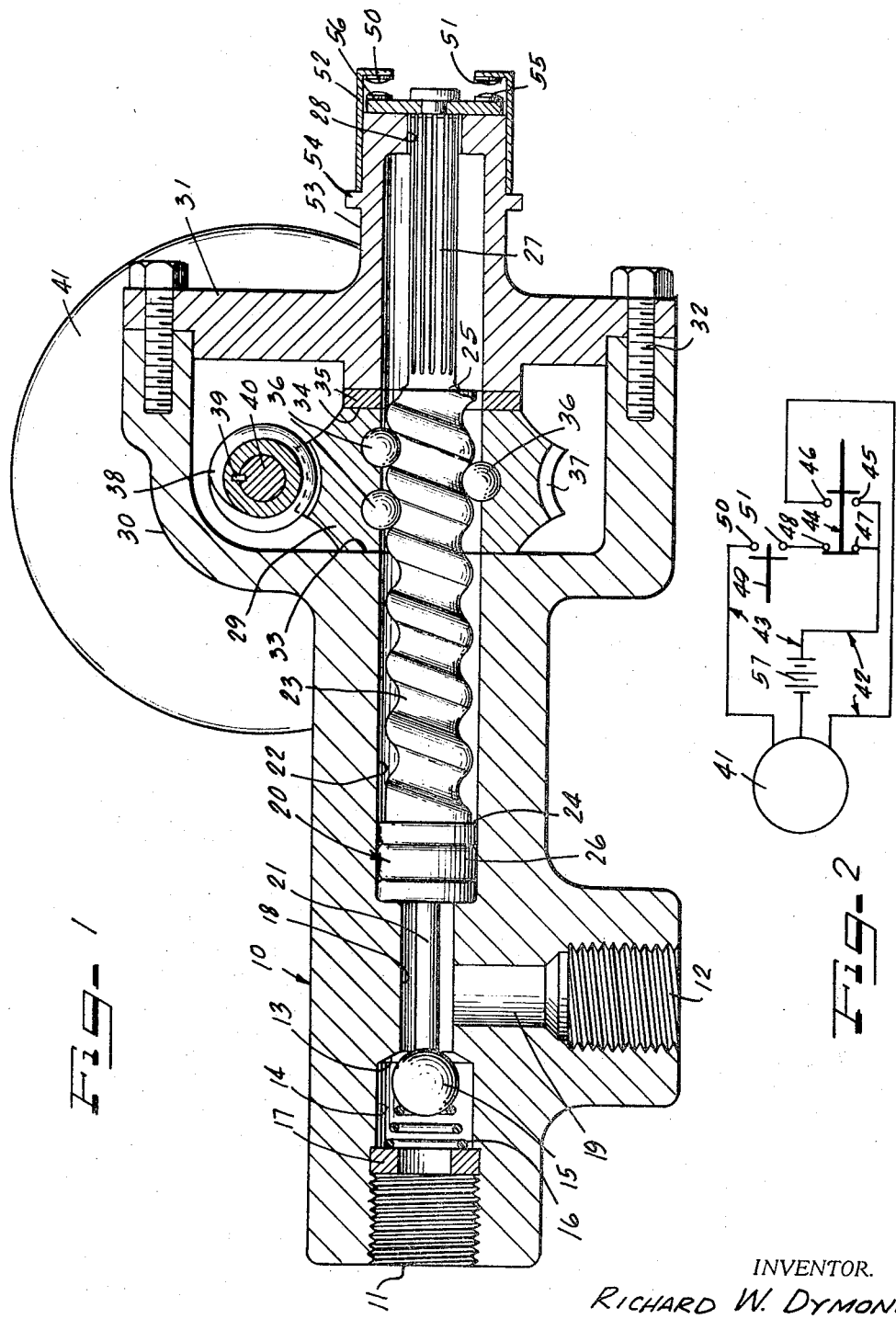
INVENTOR.
RICHARD W. DYMOND
BY *Hill, Sherman, Meroni, Gross & Simpson* ATTORNEYS

United States Patent Office 3,420,580
Patented Jan. 7, 1969

3,420,580
SKID CONTROL DEVICE
Richard W. Dymond, Rochester, Mich., assignor to TRW Inc., Cleveland, Ohio, a corporation of Ohio
Filed May 11, 1967, Ser. No. 637,675
U.S. Cl. 303—21                                        13 Claims
Int. Cl. B60t 17/18

ABSTRACT OF THE DISCLOSURE

A hydraulic unloading device for an anti-skid system wherein a valve means is disposed between a master cylinder and a wheel brake means, and wherein a piston is operated by the rotary action of an electric motor to close the valve means and to expand the volume of the hydraulic brake lines at the wheel side of the valve. The piston is splined to the valve housing and has a threaded exterior which is driven through a ball nut by a worm reduction to the electric motor. The electric motor is controlled by the deceleration sensing equipment of the anti-skid brake control and is reversibly operable for moving the piston in either longitudinal direction for opening or closing the valve means. Due to the type of drive provided, the piston is unable to move unless a control signal is applied to the electric motor.

BACKGROUND OF THE INVENTION

*Field of the invention.*—The field of art to which this invention pertains is an anti-skid brake device and, in particular, to a hydraulic unloading valve and control system for operating the unloading valve wherein the valve is used to close off or interrupt the flow of hydraulic fluid from a master cylinder to a wheel cylinder and is additionally employed to expand the volume of the hydraulic lines at the wheel side of the valve means.

SUMMARY

It is an important object of this invention to provide a hydraulic unloading valve for an anti-skid brake device wherein the operation of the valve is under complete control of a deceleration sensing system and is inoperative in the absence of an impending wheel skid condition.

It is also a feature of this invention to provide a hydraulic unloading valve for an anti-skid control system which releases the wheel brakes during an impending wheel skid condition and which prevents the inadvertent release of the brakes when braking power is required.

It is a principal object of this invention to provide an unloading valve for an anti-skid control device wherein the valve is opened and closed by the slidable movement of a piston, and wherein the slidable movement of the piston is developed through the rotary motion of a rotary driver mechanism.

It is also an object of this invention to provide a hydraulic unloading valve for an anti-skid brake control system which includes a slidable piston for operating the valve to interrupt the flow of brake fluid from a master cylinder to the wheel brake means, wherein the piston is splined to the valve housing, and wherein the piston has a threaded exterior for being driven through a ball nut arrangement by a worm reduction rotary drive mechanism.

It is a further object of this invention to provide a hydraulic unloading valve for an anti-skid control device wherein a threaded piston opens and closes the valve by being slidably moved within a piston chamber, and wherein the forward and rearward motion of the piston is accomplished by reversibly operating an electric drive motor in response to the presence or absence of an impending wheel skid condition.

It is also an object of this invention to provide a hydraulic unloading valve for an anti-skid control device wherein the valve is operated through a rotary drive mechanism associated with an electric drive motor, and wherein the operation of the motor is controlled by the presence or absence of a signal from a deceleration sensing device as well as by the position of the piston within its associated valve chamber.

These and other objects and advantages of the present invention will be understood in greater detail from the following description and the associated drawing wherein reference numerals are utilized to designate an illustrative embodiment.

BRIEF DESCRIPTION OF THE DRAWINGS

FIGURE 1 is a sectional view through a hydraulic unloading valve of the present invention showing the threaded drive shaft and the rotary drive mechanism as well as the functioning of the electric motor associated therewith, and FIGURE 2 is a schematic of a control circuit which may be utilized in connection with the motor drive of the valve of FIGURE 1 to control the opening and closing of the hydraulic unloading device.

DESCRIPTION OF THE ILLUSTRATIVE EMBODIMENT

The hydraulic unloading valve of the present invention comprises generally a valve housing 10 which has a hydraulic inlet 11 and an outlet 12. The inlet 11 may be connected to a hydraulic line which receives hydraulic pressure from a master brake cylinder as is well understood, and the outlet 12 may be connected to a further hydraulic line which supplies hydraulic fluid from the master cylinder to the individual wheel brake motor means.

The valve means which is employed to interrupt the flow of hydraulic pressure from the master cylinder to the wheel brake means comprises a valve seat 13 which is formed within a chamber 14 and a valve head 15 which is cooperable with the seat to close off the flow of fluid from the inlet 11 to the outlet 12.

The ball 15 is biased into a seated position at the valve seat 13 by a coil spring 16 which is seated at a first end against the ball 15 and at a second end against a ring 17 which is disposed at the base of the cavity 14.

The cavity 14 is communicable directly with the inlet 11 and with a further hydraulic passage 18. The passage 18 is in turn communicable with a rigid angle passage 19 and hence with the outlet 12. Accordingly, when the ball 15 is seated at the seat 13, hydraulic fluid from the master cylinder cannot actuate the wheel brakes which are connected to the outlet 12. However, if the wheel brakes are actuated prior to the seating of the ball 15, the closing of the ball 15 will not release the brakes. Accordingly, means must be provided to increase the volume of the hydraulic line at the wheel side of the valve means 13-15.

The hydraulic unloading valve provides a single means for both opening and closing the ball valve 15 and for expanding the volume of the hydraulic line at the wheel side of the valve to release the brakes after the seating of the ball valve 15. This is accomplished by the use of a piston 20 in connection with a valve rod 21.

The piston 20 is slidably disposed within a chamber 22 which is formed coaxially with the passageway 18. The piston 20 is connected to a valve rod 21, and when in the position shown in FIGURE 1, the valve rod 21 contacts the ball 15, lifting the ball from the seat 13 and thereby opening the flow of hydraulic pressure from the inlet 11 to the outlet 12 and hence to the wheel brakes. If, however, the piston 20 is moved to the right in FIGURE 1, the rod 21 will be released from the ball valve 15, allowing the spring 16 to seat the ball 15 against the valve seat 13 thereby closing off the flow of pressure to the wheel brakes. Also, if the piston 20 is allowed to move to the right in the chamber 22 even after the closing of the ball 15, the volume of the hydraulic line at the wheel side of the valve 15 will be increased due to the fact that the chamber 22 is in direct communication with the hydraulic passageways 18 and 19. Accordingly, hydraulic pressure which may be trapped at the wheel brake motor means due to the closing of the valve 15 can be released to release the brakes by the shifting of the piston to the right with regard to the orientation shown in FIGURE 1.

As is well understood in the art, the movement of the piston 20 within the chamber 22 must be controlled in response to the presence of an impending wheel skid condition. Furthermore, it is imperative that the movement of the piston 20 not be haphazard or inadvertent and must not be controlled by any unusual response of the vehicle, other than the response from a sensing device which has detected an impending wheel lock or skid condition. Devices for sensing an impending wheel skid or lock condition are known in the art and may, for instance, consist of a deceleration difference detector such as is disclosed in a pending application of Harold R. Scibbe, Serial No. 537,080. Such a deceleration difference detector compares the linear deceleration of the vehicle with the rotary deceleration of the wheels, and in response to an unbalance thereof, generates a mechanical or electrical signal which is used to operate a hydraulic unloading valve.

This invention provides a means for controlling the shifting of the position of the piston which is used to operate the hydraulic unloading valve 13–15.

More particularly, the piston 20 is provided with a threaded exterior 23 which extends from a piston head 24 to a point 25 on the shaft. It is apparent that the piston head 24 may be sealed as by a sealing member 26 to prevent the flow of hydraulic fluid past the head into the region about the threaded surface 23.

The piston or shaft is provided with a splined portion 27 which is splined to the housing 10 at an opening 28. In this way, the piston 20 is allowed to move within the chamber 22 but is prevented from being rotated and is confined to a strictly longitudinal movement.

The piston 20 is operated by a ball-nut drive which in turn is driven by a worm reduction to a drive motor. In particular, a nut 29 is rotatably positioned between a main portion 30 of the housing 10 and a cap portion 31 of the housing 10. The cap portion 31 is threadably mounted by a series of fixtures 32 to the main portion 30, and the nut 29 is provided with opposite bearing surfaces at 33 and 34. The bearing surface 34 is provided by a washer 35 which is inserted between the nut 29 and the cap portion 31 of the housing 10.

A series of ball bearings 36 are appropriately mounted within the nut 29 so as to ride within the threads of the threaded exterior 23 of the piston 20. The ball nut is well understood in the art, generally, and it is apparent that rotation of the nut 29 will result in a translation of the threaded shaft 20. The shaft 20, of course, must not rotate, and this is assured by the splined relationship of the shaft portion 27 to the housing 10 at the opening 28.

The nut 29 is provided with a series of teeth 38 formed at the exterior thereof, and the nut is driven by means of a worm 38 which is geared to the teeth 37 as is shown. The worm 38 is keyed as at 39 to a shaft 40 associated with an electric motor 41. By means of a suitable worm reduction, a small drive motor may be used to control the movement of the piston 20. Most importantly, by use of a worm reduction, the piston 20 can be maintained practically immobile, despite normal external forces, in the absence of a rotary motion of the motor 41. For instance, it is apparent from studying FIGURE 1, that the ball 15 will remain unseated even during the course of a violent impact in the absence of a rotary motion provided by the motor 41.

A typical control circuit which may be utilized to operate the motor 41 and thereby close and open the hydraulic unloading valve 13–15 in response to an impending wheel skid condition is shown in FIGURE 2. In particular, the motor 41 is controlled by first and second control circuits 42 and 43. The deceleration sensing device of the antiskid control system in which the hydraulic unloading valve of FIGURE 1 may be utilized is used to operate a switching means which is shown symbolically in FIGURE 2 by the reference numeral 44. The switching means is normally in the position shown such that a pair of contacts 45 and 46 are normally opened thereby leaving the circuit 42 in an opened state. However, a pair of contacts 47 annd 48 associated with the circuit 43 are maintained closed by the switch 44. However, the control circuit 43 is not in a closed state due to the presence of an additional switch 49 which is held in a normally opened condition.

The switch 49 illustrated diagrammatically only in FIGURE 1 may consist of a first set of contacts 50 and 51 which are mounted on a sleeve 52. The sleeve 52 may be slidable on a neck portion 53 of the housing cap member 31. Also, a suitable biasing means may be provided to maintain the sleeve 52 normally against a collar 54 formed about the neck portion 53. In addition, a pair of contacts 55 and 56 may be mounted at the end of the splined portion 27 of the piston 20. As shown in FIGURE 1, the contacts 50 and 51 are normally open.

In operation, the sensing of an impending wheel skid condition by the deceleration sensor of the anti-skid control device may be used to move the switch means 44 of FIGURE 2 from the position shown to its opposite position, namely with the contacts 45 and 46 closed and the contacts 47 and 48 opened. This movement of the switch 44 will complete the control circuit 42 and connect a battery or other suitable power source 57 to the motor 41. The motor will be energized, and the piston 20 will be moved to the right (in FIGURE 1) through the worm reduction shown. When the piston begins its movement to the right, the contacts 50 and 51 will be closed. However, the control circuit 43 will not at that time be energized due to the fact that the contacts 47 and 48 will have been opened by the sensing of a deceleration unbalance condition.

As soon as the deceleration unbalance or impending wheel skid condition ceases, the switch 44 will be moved to the position shown in FIGURE 2, thereby opening the contacts 45 and 46 and deenergizing the control circuit 42. This will, of course, close the contacts 47 and 48 and, due to the closed position of the switch 49, energize the control circuit 43. The energization of the control circuit 43 will connect the battery or suitable power source 57 in a reverse direction with respect to the motor 41 and cause the piston 20 to be moved to the left. This will then cause the valve 15 to be unseated from the seat 13 and to reconnect the master cylinder to the wheel brakes.

I claim:

1. In an anti-skid brake system including a master cylinder, wheel brake motor means, hydraulic lines coupling the master cylinder to the brake motor means and a deceleration sensor for generating a signal responsive to an impending wheel skid condition, a hydraulic brake unloading device comprising:

valve means operably disposed within said hydraulic lines intermediate said master cylinder and said wheel brake motor means for opening and closing the communication therebetween, an actuator housing having a translation chamber formed therein, a piston carried in said translation chamber and being operably coupled to said valve means for operating the same in response to the translation of the piston within said chamber, a piston drive mechanism, said piston being translated in said chamber in response to a rotary motion of said piston drive mechanism, and means preventing the translation of said piston and hence the operation of said valve means in the absence of a rotary motion of said piston drive mechanism.

2. A hydraulic brake unloading device in accordance with claim 1 wherein said piston comprises a threaded shaft slidably carried within said actuator housing and wherein said piston drive mechanism includes a ball nut rotatably mounted relative to said housing and threadedly engaged to said piston, and means for rotating said ball nut to develop a translatory motion of said shaft.

3. A hydraulic brake unloading device in accordance with claim 1 wherein said piston drive mechanism is operated by an electric motor and wherein said electric motor is controlled by the signal response of said deceleration sensor.

4. A hydraulic brake unloading device in accordance with claim 1 wherein said chamber is communicable with said hydraulic brake line at the wheel side of said valve means and wherein only a portion of the translation of said piston is required to close said valve means for interrupting the communication of said master cylinder with said wheel brake motor means and wherein further translation of said piston increases the volume of said hydraulic line at the wheel side of said valve means for releasing and unloading hydraulic pressure otherwise trapped at said wheel brake motor means by the closing of said valve means.

5. A hydraulic brake unloading device in accordance with claim 2 including means for preventing rotation of said piston during slidable movement thereof within said translation chamber.

6. A hydraulic brake unloading device in accordance with claim 3 wherein said electric motor is reversibly drivable in response to the presence or absence of a control signal from said deceleration sensor, whereby both the opening and closing of said valve means is controlled by the operation of said electric motor.

7. In an anti-skid brake system including a master cylinder, wheel brake motor means, hydraulic lines coupling the master cylinder to the brake motor means and a deceleration sensor for generating a signal responsive to an impending wheel skid condition, a hydraulic brake unloading device comprising:

valve means operably disposed within said hydraulic lines intermediate said master cylinder and said wheel brake motor means for opening and closing the communication therebetween, an actuator housing having a translation chamber formed therein, a piston carried in said translation chamber and being operably coupled to said valve means for operating the same in response to the translation of the piston within said chamber, a piston drive mechanism, said piston drive mechanism including a reversibly operable electric motor, a control network including first and second control circuits for energizing said motor into first and second rotary directional senses, respectively, said first and second control circuits having first and second switch means, respectively, for opening one of said circuits and closing the other in response to the presence of a control signal from deceleration sensor, and for closing said one circuit and opening the other in response to the absence of a control signal from said deceleration sensor, and one of said control circuits having third switch means for opening and said closing said second circuit in response to the translation positioning of said piston, whereby said piston may be moved toward an opened or closed position in response to said deceleration sensor and whereby the degree of movement of said piston is restricted by said third switch means.

8. A hydraulic brake unloading device in accordance with claim 7 wherein said piston drive mechanism includes a worm reduction and screw drive operated by said electric motor, said piston being translated in said chamber in response to the rotary motion of said screw drive, whereby said piston is held immobile unless driven by said motor.

9. A hydraulic brake unloading device in accordance with claim 8 wherein a portion of said piston is splined or otherwise engaged to said actuator housing to allow the piston to slide within said chamber while preventing rotation of said piston in response to the rotation of said worm reduction and motor drive.

10. A hydraulic brake unloading device in accordance said hydraulic line at the wheel side of said valve means and wherein the translation of said piston in a first direction allows said valve means to close and subsequently expand the volume of the hydraulic line at the wheel side of said valve means.

11. In an anti-wheel skid control system, a drive for a hydraulic unloading valve comprising:

a screw piston operably coupled to the hydraulic unloading valve, a rotary motor driver, means operably coupling the rotary motor driver to the screw piston for developing a translatory movement of the piston, and means controlling the degree and direction of movement of said rotary motor driver in response to a sensed deceleration of an associated vehicle wheel.

12. A drive in accordance with claim 11 wherein a ball nut is threadably coupled to said screw piston and wherein said ball nut is driven through a worm reduction drive operated by said rotary drive motor whereby said piston is held immobile unless driven by said rotary motor.

13. A drive in accordance with claim 12 wherein said rotary drive motor is an electric motor and wherein first and second control circuits are employed to operate said motor in first and second rotary directions and wherein the energizing of each of said control circuits is simultaneously regulated by the presence or absence of a signal response from the skid sensing elements of the anti-skid control system.

References Cited

UNITED STATES PATENTS 2,964,048    12/1960    Mortimer _____ 188—181 X
3,231,315    1/1966    Turnbull _____ 303—21 X DUANE A. REGER, *Primary Examiner.*

U.S. Cl. X.R.

188—181; 200—61.46